(12) United States Patent
Sexton et al.

(10) Patent No.: US 9,145,735 B2
(45) Date of Patent: *Sep. 29, 2015

(54) METHODS OF OPERATING BEARING APPARATUSES

(71) Applicant: US SYNTHETIC CORPORATION, Orem, UT (US)

(72) Inventors: Timothy N. Sexton, Genola, UT (US); Craig H. Cooley, Saratoga Springs, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,218

(22) Filed: Nov. 13, 2013

(65) Prior Publication Data

US 2014/0072249 A1 Mar. 13, 2014

Related U.S. Application Data

(63) Continuation of application No. 13/599,752, filed on Aug. 30, 2012, now Pat. No. 8,616,770, which is a continuation of application No. 12/394,489, filed on Feb. 27, 2009, now Pat. No. 8,277,124.

(51) Int. Cl.
*F16C 33/00* (2006.01)
*F16C 33/24* (2006.01)
(Continued)

(52) U.S. Cl.
CPC .......... *E21B 4/003* (2013.01); *F16C 17/04* (2013.01); *F16C 33/043* (2013.01); *F16C 33/26* (2013.01); *F16C 2352/00* (2013.01)

(58) Field of Classification Search
CPC ........ F16C 17/04; F16C 33/043; F16C 33/26; F16C 2352/00; E21B 4/003

USPC ........ 384/92, 95, 97, 98, 284, 285, 297, 298, 384/420, 907.1; 175/374, 433; 428/212, 428/408, 469, 472
See application file for complete search history.

(56) References Cited

U.S. PATENT DOCUMENTS

| 4,345,798 A | 8/1982 | Cortes |
| 4,410,054 A | 10/1983 | Nagel et al. |

(Continued)

FOREIGN PATENT DOCUMENTS

WO    WO2010/098951    9/2010

OTHER PUBLICATIONS

International Search Report and Written Opinion from International Application No. PCT/US2010/022980 mailed Sep. 1, 2010.

(Continued)

*Primary Examiner* — Thomas R. Hannon
*Assistant Examiner* — Adam D Rogers
(74) *Attorney, Agent, or Firm* — Dorsey & Whitney LLP (57) ABSTRACT

In an embodiment, a bearing apparatus comprises a first bearing assembly including a plurality of circumferentially-spaced first bearing elements each of which includes a first bearing surface. The bearing apparatus further includes a second bearing assembly including a plurality of circumferentially-spaced second bearing elements each of which includes a second bearing surface oriented to engage the first bearing surfaces of the first bearing assembly during operation. At least one of the second bearing elements may be circumferentially spaced from an adjacent one of the second bearing elements by a lateral spacing greater than a lateral dimension of the at least one of the second bearing elements.

19 Claims, 5 Drawing Sheets

(51) Int. Cl.
*F16C 17/04* (2006.01)
*E21B 4/00* (2006.01)
*F16C 33/04* (2006.01)
*F16C 33/26* (2006.01)

(56) References Cited

U.S. PATENT DOCUMENTS

| | | | |
|---|---|---|---|
| 4,560,014 | A | 12/1985 | Geczy |
| 4,620,601 | A | 11/1986 | Nagel |
| 4,629,013 | A | 12/1986 | Kruger et al. |
| 5,037,212 | A | 8/1991 | Justman et al. |
| 5,092,687 | A | 3/1992 | Hall |
| 5,364,192 | A | 11/1994 | Damm et al. |
| 5,480,233 | A | 1/1996 | Cunningham |
| 5,498,081 | A | 3/1996 | Dennis et al. |
| 7,255,480 | B2 | 8/2007 | John et al. |
| 7,552,782 | B1 | 6/2009 | Sexton et al. |
| 7,559,695 | B2 | 7/2009 | Sexton et al. |
| 7,703,982 | B2 | 4/2010 | Cooley |
| 7,754,333 | B2 | 7/2010 | Eyre et al. |
| 7,842,111 | B1 | 11/2010 | Sani |
| 7,870,913 | B1 | 1/2011 | Sexton et al. |
| 8,147,142 | B1 | 4/2012 | Peterson |
| 8,277,124 | B2 | 10/2012 | Sexton et al. |
| 8,312,943 | B1 * | 11/2012 | Miess et al. .................. 175/374 |
| 8,616,304 | B2 * | 12/2013 | Scott et al. .................... 175/107 |
| 8,616,770 | B2 * | 12/2013 | Sexton et al. .................. 384/95 |
| 2004/0190804 | A1 | 9/2004 | John et al. |
| 2005/0263328 | A1 | 12/2005 | Middlemiss |
| 2006/0060391 | A1 | 3/2006 | Eyre et al. |
| 2007/0046119 | A1 | 3/2007 | Cooley |
| 2007/0046120 | A1 | 3/2007 | Cooley et al. |
| 2007/0081749 | A1 | 4/2007 | Sexton et al. |
| 2010/0226759 | A1 | 9/2010 | Cooley et al. |
| 2012/0325560 | A1 | 12/2012 | Sexton et al. |

OTHER PUBLICATIONS

U.S. Appl. No. 12/394,489, Apr. 1, 2011, Office Action.
U.S. Appl. No. 12/394,489, Aug. 3, 2011, Office Action.
U.S. Appl. No. 12/394,489, Oct. 26, 2011, Office Action.
U.S. Appl. No. 12/394,489, Feb. 13, 2012, Office Action.
U.S. Appl. No. 12/394,489, Jun. 4, 2012, Notice of Allowance.
U.S. Appl. No. 12/394,489, Sep. 12, 2012, Issue Notification.
U.S. Appl. No. 13/599,752, Feb. 15, 2013, Office Action.
U.S. Appl. No. 13/599,752, Jun. 5, 2013, Office Action.
U.S. Appl. No. 13/599,752, Aug. 13, 2013, Notice of Allowance.
U.S. Appl. No. 13/599,752, Dec. 11, 2013, Issue Notification.

* cited by examiner

METHODS OF OPERATING BEARING APPARATUSES

CROSS-REFERENCE TO RELATED APPLICATIONS

This application is a a continuation of U.S. application Ser. No. 13/599,752 filed on 30 Aug. 2012, which is a continuation of U.S. application Ser. No. 12/394,489 filed on 27 Feb. 2009 (now U.S. Pat. No. 8,277,124 issued on 2 Oct. 2012). The disclosure of each of foregoing applications is incorporated, in its entirety, by this reference.

BACKGROUND

Figure 1:
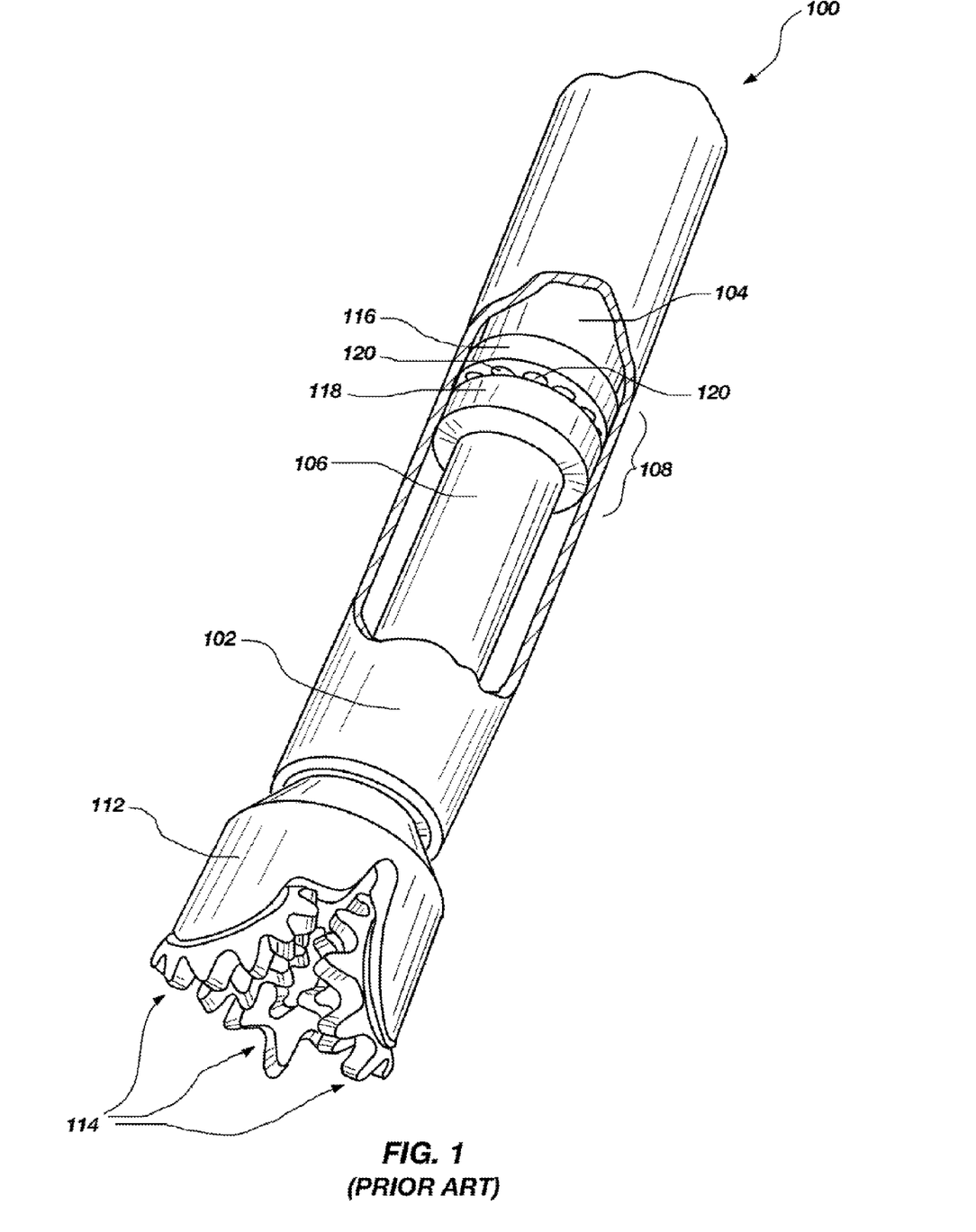
FIG. 1 is a schematic isometric cutaway view of a prior art subterranean drilling system including at least one thrust-bearing apparatus.

Subterranean drilling systems that employ downhole drilling motors are commonly used for drilling boreholes in the earth for oil and gas exploration. FIG. 1 is a schematic isometric cutaway view of a prior art subterranean drilling system 100. The subterranean drilling system 100 includes a housing 102 enclosing a downhole drilling motor 104 that is operably connected to an output shaft 106. A thrust-bearing apparatus 108 is also operably coupled to the downhole drilling motor 104. A rotary drill bit 112 configured to engage a subterranean formation and drill a borehole is connected to the output shaft 106. The rotary drill bit 112 is shown as a roller-cone bit including a plurality of roller cones 114. As the borehole is drilled, pipe sections may be connected to the subterranean drilling system 100 to form a drill string capable of progressively drilling the borehole to a greater depth within the earth.

The thrust-bearing apparatus 108 includes a stator 116 that does not rotate and a rotor 118 that is attached to the output shaft 106 and rotates with the output shaft 106. The stator 116 and rotor 118 each include a plurality of bearing elements 120 that may be fabricated from polycrystalline diamond compacts ("PDCs") that provide diamond bearing surfaces that bear against each other during use.

In operation, high-pressure drilling fluid is circulated through the drill string and power section (not shown) of the downhole drilling motor 104, usually prior to the rotary drill bit 112 engaging the bottom of the borehole, to generate torque and rotate the output shaft 106 and the rotary drill bit 112 attached to the output shaft 106. When the rotary drill bit 112 engages the bottom of the borehole, a thrust load is generated, which is commonly referred to as "on-bottom thrust" that tends to compress the thrust-bearing apparatus 108. The on-bottom thrust is carried, at least in part, by the thrust-bearing apparatus 108. Fluid flow through the power section may cause what is commonly referred to as "off-bottom thrust," which is carried, at least in part, by another thrust-bearing apparatus that is not shown in FIG. 1. The drilling fluid used to generate the torque for rotating the rotary drill bit 112 exits openings formed in the rotary drill bit 112 and returns to the surface, carrying cuttings of the subterranean formation through an annular space between the drilled borehole and the subterranean drilling system 100. Typically, a portion of the drilling fluid is diverted by the downhole drilling motor 104 to cool and lubricate the bearing elements 120 of the thrust-bearing apparatus 108.

The off-bottom and on-bottom thrust carried by the thrust-bearing apparatuses can be extremely large. The operational lifetime of the thrust-bearing apparatuses often determines the useful life of the subterranean drilling system 100. Therefore, manufacturers and users of subterranean drilling systems continue to seek improved bearing apparatuses.

SUMMARY

Embodiments of the invention are directed to bearing apparatuses comprising a bearing assembly including bearing elements, with at least one bearing element spaced from an adjacent bearing element by a lateral spacing greater than a lateral dimension of the at least one bearing element. The disclosed bearing apparatuses may be used in a number of applications, such as downhole motors in subterranean drilling systems or directional drilling systems, roller-cone drill bits, and many other applications.

In an embodiment, a bearing apparatus comprises a first bearing assembly including a plurality of circumferentially-spaced first bearing elements each of which includes a first bearing surface. The bearing apparatus further includes a second bearing assembly including a plurality of circumferentially-spaced second bearing elements each of which includes a second bearing surface oriented to engage the first bearing surfaces of the first bearing assembly during operation. At least one of the second bearing elements may be circumferentially spaced from an adjacent one of the second bearing elements by a lateral spacing greater than a lateral dimension of the at least one of the second bearing elements.

Other embodiments include downhole motors for use in drilling systems that may utilize any of the disclosed bearing apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention are directed to bearing apparatuses comprising a bearing assembly including bearing elements, with at least one bearing element spaced from an adjacent bearing element by a lateral spacing greater than a lateral dimension of the at least one bearing element. The disclosed bearing apparatuses may be used in a number of applications, such as downhole motors in subterranean drilling systems or directional drilling systems, roller-cone drill bits, and many other applications.

Figure 2A:
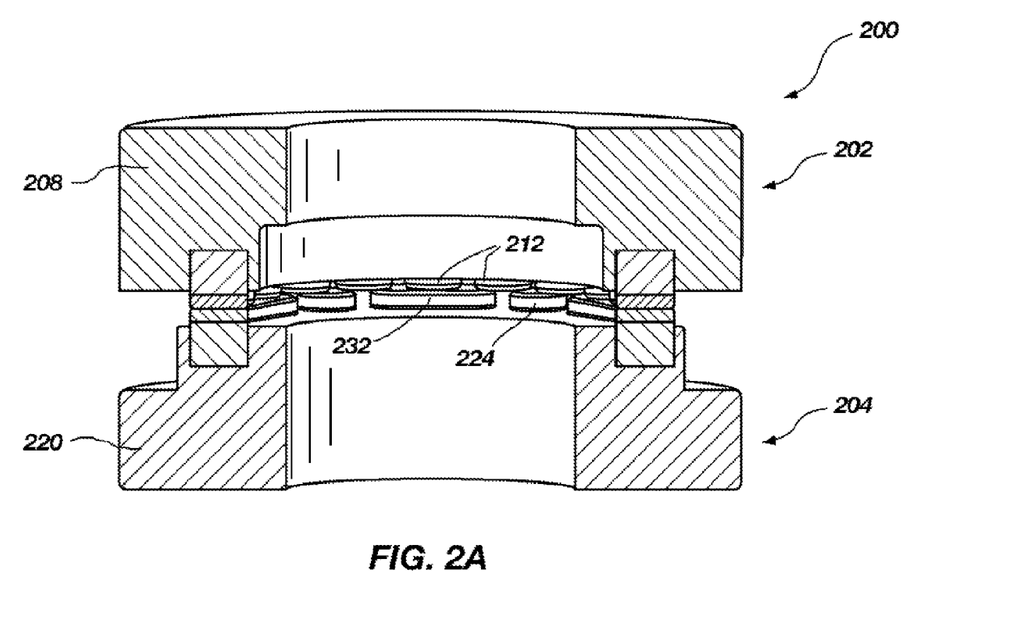
FIG. 2A is an isometric cutaway view of a thrust-bearing apparatus according to an embodiment of the invention.

FIG. 2A is an isometric cutaway view of a thrust-bearing apparatus 200, suitable for use in a subterranean drilling system, according to an embodiment of the invention. The thrust-bearing apparatus 200 includes a first bearing assembly 202 and a second bearing assembly 204. One of the first bearing assembly 202 or the second bearing assembly 204 may serve as a rotor and the other one of the first bearing assembly 202 or the second bearing assembly 204 may serve as a stator in the thrust-bearing apparatus 200. One or both of the first bearing assembly 202 and the second bearing assembly 204 may rotate about a thrust axis 206 (FIG. 2B) along which thrust may be generally directed during use.

Figure 2B:
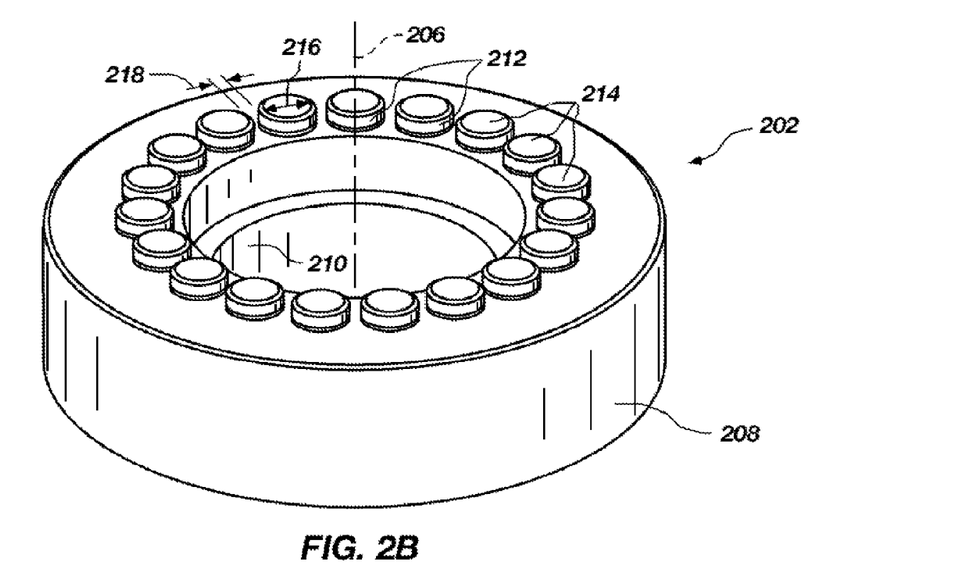
FIG. 2B is an isometric view of the first bearing assembly shown in FIG. 2A.

FIG. 2B is an isometric view of the first bearing assembly 202 shown in FIG. 2A. The first bearing assembly 202 includes a first bearing support ring 208 defining an aperture 210 through which a shaft of, for example, a downhole drilling motor may pass. The first bearing support ring 208 may comprise a metallic material (e.g., steel) or a more wear-resistant material, such as cemented tungsten carbide, silicon carbide, or another more wear-resistant material. The first bearing support ring 208 includes a plurality of circumferentially-spaced first bearing elements 212 mounted thereto and distributed about the thrust axis 206 (FIG. 2B). For example, the first bearing elements 212 may be mounted to the first bearing support ring 208 by brazing or press-fitting, via one or more fasteners, or another suitable technique. Each of the first bearing elements 212 includes a bearing surface 214. The first bearing elements 212 exhibit an average first lateral dimension (e.g., an average diameter) that may be determined by taking the average of the respective maximum lateral dimensions of each first bearing element 212. At least one first bearing element 212 may be separated from an adjacent first bearing element 212 by a respective first lateral spacing 218 that is less than a lateral dimension 216 (e.g., a diameter) of the at least one first bearing element 212. The first lateral spacing 218 may be measured as a linear distance between adjacent first bearing elements 212 or an arc length between adjacent first bearing elements 212 based on a reference circle that extends about the thrust axis 206. In an embodiment, a portion of the first bearing elements 212 or each first bearing element 212 may be separated from an adjacent first bearing element 212 by a respective lateral spacing 218 that is less than the average first lateral dimension of the first bearing elements 212.

In some embodiments, the first bearing elements 212 may be substantially equally circumferentially spaced from each other, with the respective first lateral spacing 218 between adjacent first bearing elements 212 being approximately the same. However, in other embodiments, the first bearing elements 212 may be non-uniformly circumferentially spaced from each other.

Figure 2C:
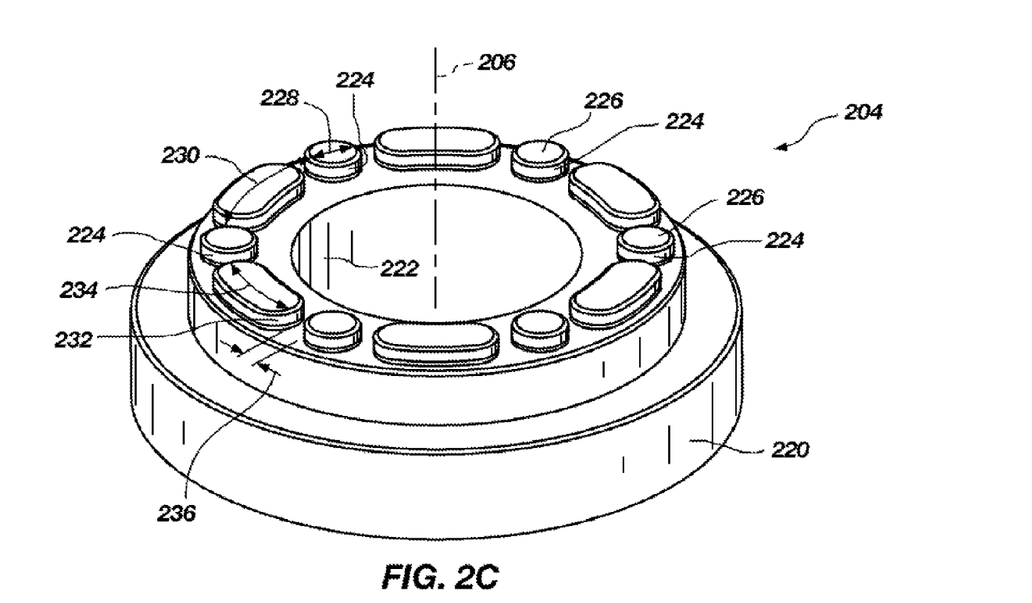
FIG. 2C is an isometric view of the second bearing assembly shown in FIG. 2A.

FIG. 2C is an isometric view of the second bearing assembly 204 shown in FIG. 2A. The second bearing assembly 204 includes a second bearing support ring 220 defining an aperture 222 through which the shaft of, for example, the downhole drilling motor may pass. The second bearing support ring 220 may be made from the same or similar materials as the first bearing support ring 208 (FIGS. 2A and 2B). The second bearing support ring 220 includes a plurality of circumferentially-spaced second bearing elements 224 mounted thereto using any of the previously mentioned mounting techniques. The second bearing elements 224 are distributed about the thrust axis 206 (FIG. 2B). The number of second bearing elements 224 may be substantially less than the number of first bearing elements 212 (FIG. 2B). For example, the first bearing assembly 202 may include more than two to four times (e.g., three times) the number of bearing elements included in the second bearing assembly 204. As merely a non-limiting embodiment, the first bearing assembly 202 may include nineteen of the first bearing elements 212 and the second bearing assembly 204 may include six of the second bearing elements 224. Each second bearing element 224 includes a bearing surface 226 that opposes and bears against one or more of the bearing surfaces 214 (FIG. 2B) during use.

Still referring to FIG. 2C, the second bearing elements 224 exhibit an average second lateral dimension (e.g., an average diameter) that may be determined by taking the average of the respective maximum lateral dimensions of each second bearing element 224. At least one second bearing element 224 may be separated from an adjacent second bearing element 224 by a respective second lateral spacing 230 that is greater than a second lateral dimension 228 (e.g., a diameter) of the at least one second bearing element 224. The second lateral spacing 230 may be measured as a linear distance between adjacent second bearing elements 224 or an arc length between adjacent second bearing elements 224 based on a reference circle that extends about the thrust axis 206. In an embodiment, a portion of the second bearing elements 224 or each second bearing element 224 may be separated from an adjacent second bearing element 224 by a respective lateral spacing 230 that is less than the average second lateral dimension of the second bearing elements 224. In an embodiment, the second lateral spacing 230 may be at least about two times (e.g., about two to about four times) the average second lateral dimension. The second lateral dimension 228 of each second bearing element 224 may be equal to or greater than the first lateral spacing 218 (FIG. 2B) between adjacent first bearing elements 212 (FIG. 2B) to prevent the first and second bearing assemblies 202 and 204 from interlocking with each other during use.

In some embodiments, the second bearing elements 224 may be substantially equally circumferentially spaced from each other, with the respective second lateral spacing 230 between adjacent second bearing elements 224 being approximately the same. However, in other embodiments, the second bearing elements 224 may be non-uniformly circumferentially spaced from each other.

During use, fluid (e.g., drilling mud) is pumped through a drill string of a subterranean drilling system to effect rotation of a drill bit (not shown). A portion of the fluid may also be permitted to flow around and/or over the first bearing elements 212 and second bearing elements 224 of the first and second bearing assemblies 202 and 204 for cooling and/or lubrication thereof. Referring to the illustrated embodiment shown in FIG. 2C and the partial cross-sectional view of FIG. 2D, in some embodiments, in order to enhance the flow rate around and over the first bearing elements 212 (FIG. 2B) and the second bearing elements 224, at least one flow obstruction element may be provided. For example, a plurality of flow obstruction elements 232 may be provided, with each flow obstruction element 232 positioned between adjacent second bearing elements 224. Each flow obstruction element 232 may have a lateral dimension 234 such that they occupy a major portion of the linear or arcuate distance between the adjacent second bearing elements 224. For example, in the illustrated embodiment, the flow obstruction elements 232 occupy the distance between adjacent bearing elements 224 such that a minimum lateral dimension 236 of a gap between a flow obstruction element 232 and an adjacent second bearing element 224 is less than the average second lateral dimension of the second bearing elements 224. In the illustrated embodiment, the flow obstruction elements 232 have an arcuate shape and may be integrally formed as part of the second bearing support ring 220. However, the flow obstruction elements 232 may be removable, replaceable, or may have other configurations that depart from the illustrated configuration.

Figure 2D:
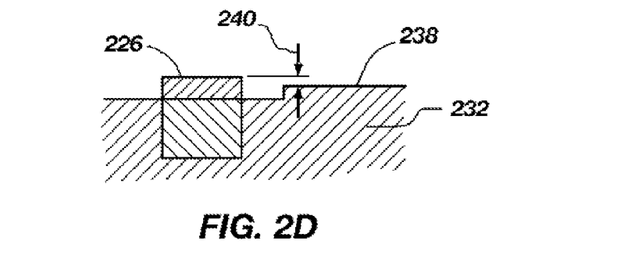
FIG. 2D is a partial cross-sectional view of the second bearing assembly shown in FIG. 2C that details a bearing element and a flow obstruction element thereof.

Referring specifically to FIG. 2D, the flow obstruction elements 232 may have a terminal surface 238 that is positioned below the bearing surfaces 226 of the second bearing elements 224 by a distance 240. The distance 240 may be chosen to be greater than the expected wear of the second bearing elements 224 so that the terminal surfaces 238 (shown in FIGS. 2C and 2D) of the flow obstruction elements 232 do not contact the first bearing elements 212 during use. More particularly, each flow obstruction element 232 may be configured so that fluid flow between adjacent second bearing elements 224 may exhibit an average Reynolds number of about 10,000 to about 60,000 (e.g., about 45,000 to about 60,000) during use. In an embodiment, the distance 240 may be about 0.0050 inches to about 0.030 inches and, more particularly, about 0.010 inches.

As an alternative to or in addition to the flow obstruction elements 232 being employed on the second bearing assembly 204, in another embodiment, flow obstruction elements may also be employed on the first bearing assembly 202 between the first bearing elements 212 thereof.

Figure 3A:
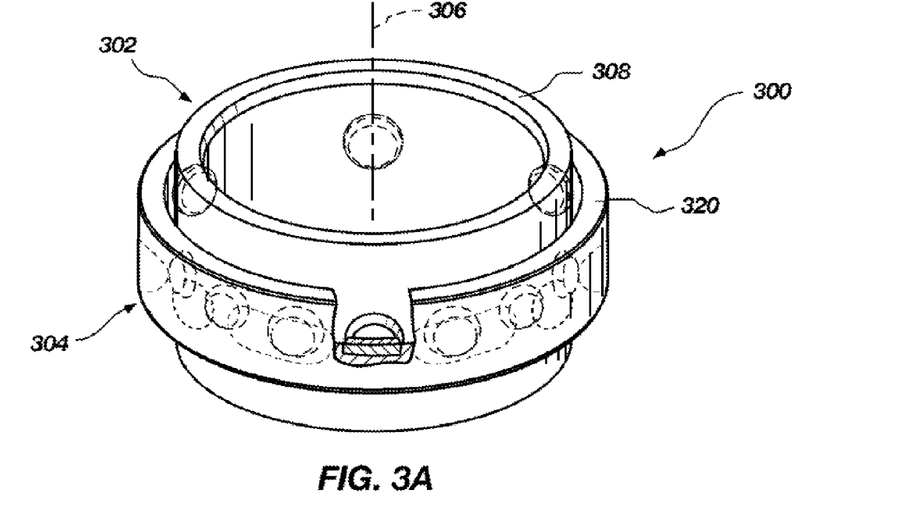
FIG. 3A is an isometric view of a radial bearing apparatus according to an embodiment of the invention.

FIG. 3A is an isometric view of a radial bearing apparatus 300, suitable for use in a subterranean drilling system, according to an embodiment of the invention. The radial bearing apparatus 300 includes an inner race 302 received by an outer race 304. One of the inner race 302 or the outer race 304 may serve as a rotor and the other one of the inner race 302 or the outer race 304 may serve as a stator in the radial bearing apparatus 300. One or both of the inner race 302 and the outer race 304 rotate about a rotation axis 306 during use.

Figure 3B:
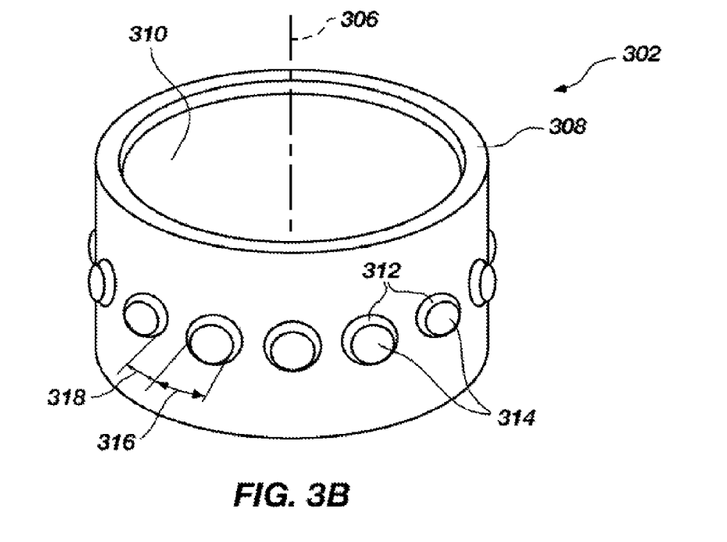
FIG. 3B is an isometric view of the inner race shown in FIG. 3A.

FIG. 3B is an isometric view of the inner race 302 shown in FIG. 3A. The inner race 302 includes a first bearing support ring 308 defining an aperture 310 through which a shaft or a spindle may be inserted. The first bearing support ring 308 may be made from the same or similar materials as the first bearing support ring 208 (FIGS. 2A and 2B). The first bearing support ring 308 includes a plurality of circumferentially-spaced first bearing elements 312 mounted thereto using any of the previously mentioned mounting techniques. The first bearing elements 312 are distributed about the rotation axis 306. Each first bearing element 312 includes a convexly-curved bearing surface 314 oriented in a radially outward direction. The first bearing elements 312 exhibit an average first lateral dimension that may be determined by taking the average of the respective maximum lateral dimensions of each first bearing element 312. At least one first bearing element 312 may be separated from an adjacent first bearing element 312 by a respective lateral spacing 318 that is less than a first lateral dimension (e.g., a diameter) 316 of the at least one first bearing element 312 and may be measured as an arc length between adjacent first bearing elements 312 based on a reference circle that extends about the rotation axis 306. In an embodiment, a portion of or each first bearing element 312 may be separated from an adjacent first bearing element 312 by a respective lateral spacing 318 that is less than the average first lateral dimension of the first bearing elements 312. The first bearing elements 312 may be substantially equally circumferentially spaced or non-uniformly spaced about the rotation axis 306.

Figure 3C:
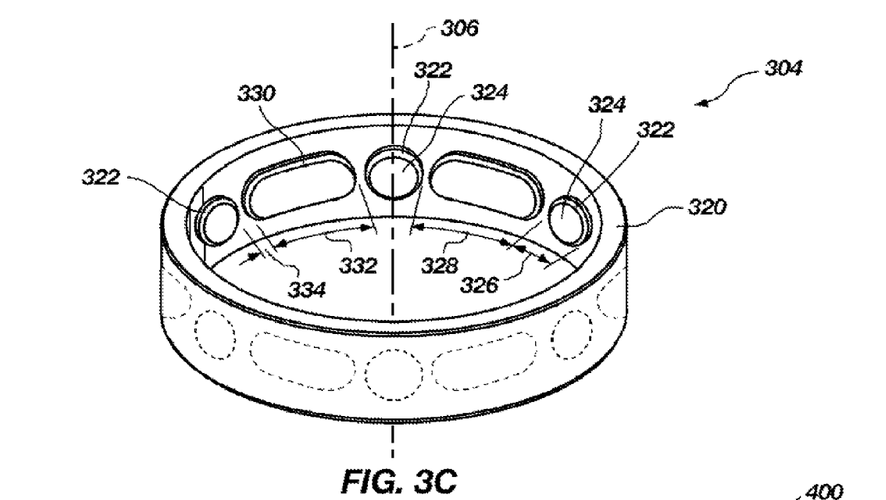
FIG. 3C is an isometric view of the outer race shown in FIG. 3A.

FIG. 3C is an isometric view of the outer race 304 shown in FIG. 3A. The outer race 304 includes a second bearing support ring 320 having a plurality of circumferentially-spaced second bearing elements 322 mounted thereto using any of the previously mentioned mounting techniques. The second bearing support ring 320 may be made from the same or similar materials as the first bearing support ring 208 (FIGS. 2A and 2B). The second bearing elements 322 are distributed about the rotation axis 306. Each second bearing element 322 includes a concavely-curved bearing surface 324 that corresponds to the curvature of the convexly-curved bearing surfaces 314 of the first bearing elements 312 and is oriented in a radially inward direction. The second bearing elements 322 exhibit an average lateral dimension that may be determined by taking the average of the respective maximum lateral dimensions of each second bearing element 322.

Still referring to FIG. 3C, at least one second bearing element 322 may be separated from an adjacent second bearing element 322 by a respective lateral spacing 328 that is greater than a second lateral dimension 326 of the at least one second bearing element 322 and may be measured as an arc length based on a reference circle that extends about the rotation axis 306. In an embodiment, a portion of or each second bearing element 322 may be separated from an adjacent second bearing element 322 by a respective lateral spacing 328 that is greater than the average second lateral dimension of the second bearing elements 322. In an embodiment, the lateral spacing 328 may be at least about two times (e.g., about two to about four times) the average lateral dimension of the second bearing elements 322. The average lateral dimension of the second bearing elements 322 may be equal to or greater than the lateral spacing 318 between adjacent first bearing elements 312 to prevent interlocking of the inner race 302 and the outer race 304 during use. The number of second bearing elements 322 may be substantially less than the number of first bearing elements 312. For example, the first bearing assembly 302 may include more than two to four times (e.g., three times) the number of bearing elements included in the second bearing assembly 304. As merely a non-limiting embodiment, the inner race 302 may include nineteen of the first bearing elements 312 and the outer race 304 may include six of the second bearing elements 322.

In an embodiment, the second bearing elements 322 are substantially equally circumferentially spaced about the rotation axis 306. However, in other embodiments, the second bearing elements 322 may be circumferentially non-uniformly spaced about the rotation axis 306.

During use, the bearing surfaces 314 of the first bearing elements 312 slidingly engage bearing surfaces 324 of the second bearing elements 322 as the inner race 302 rotates relative to the outer race 304.

During operation, fluid (e.g., drilling mud) may be pumped between the inner race 302 and the outer race 304 to flow around and/or over the first bearing elements 312 and second bearing elements 322 for cooling and/or lubrication thereof. Referring to the illustrated embodiment shown in FIG. 3C and the partial cross-sectional view of FIG. 3D, in some embodiments, in order to provide a selected flow rate around and/or over the first bearing elements 312 and the second bearing elements 322, a plurality of flow obstruction elements 330 may be provided. Each flow obstruction element 330 is positioned between adjacent second bearing elements 322. Each flow obstruction element 330 may exhibit a maximum lateral dimension or width 332 such that it occupies a major portion of the arcuate distance between adjacent second bearing elements 322. For example, in the illustrated embodiment, the flow obstruction elements 330 occupy the distance between adjacent bearing elements 322 such that an angular width 334 of a gap between a flow obstruction element 330 and an adjacent second bearing element 322 is less than the average lateral dimension of the second bearing elements 322.

As an alternative to or in addition to the flow obstruction elements 330 being employed on the second bearing assembly 304, in another embodiment, flow obstruction elements may also be employed on the first bearing assembly 302 between the first bearing elements 312 thereof.

Figure 3D:
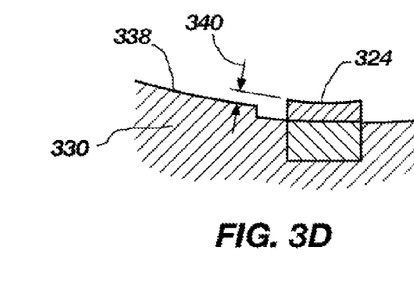
FIG. 3D is a partial cross-sectional view of the outer race that details a bearing element and a flow obstruction element thereof.

Still referring to FIG. 3D, each flow obstruction element 330 may include a terminal surface 338 (shown in FIGS. 3C and 3D as curved) that is positioned below the bearing surfaces 324 of the second bearing elements 322 by a distance 340. The distance 340 may be chosen to be greater than the expected wear of the second bearing elements 322 so that the terminal surfaces 338 of the flow obstruction elements 330 do not contact the first bearing elements 312 during use. In an embodiment, the distance 340 may be between 0.0050 inches and 0.030 inches and, more particularly, about 0.010 inches.

The radial bearing apparatus 300 may be employed in a variety of mechanical applications. For example, a roller-cone rotary drill bit may employ the radial bearing apparatus 300. More specifically, the inner race 302 may be mounted to a spindle of a roller cone and the outer race 304 may be affixed to an inner bore formed within the roller cone, and the outer race 304 and inner race 302 may be assembled to form the radial bearing apparatus 300. The radial bearing apparatus 300 may also be employed in a downhole drilling motor and turbine.

Figure 4:
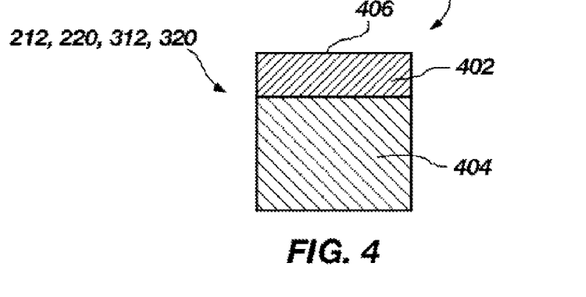
FIG. 4 is a side cross-sectional view of an embodiment of a bearing element suitable for use in any of the bearing assemblies disclosed herein.

Referring to FIG. 4, a number of different types of bearing elements may be employed in the thrust-bearing apparatus 200 and radial bearing apparatus 300. FIG. 4 is a side cross-sectional view of an embodiment of a bearing element 400 suitable for use in any of the bearing assemblies disclosed herein. The bearing element 400 may be a super-hard compact that includes a super-hard table 402 of super-hard material bonded to a substrate 404. The super-hard table 402 includes a suitably configured bearing surface 406. For example, the bearing element may be PDC including a polycrystalline diamond table bonded to a cobalt-cemented tungsten carbide substrate.

The term "super-hard," as used herein, means a material having a hardness at least equal to a hardness of tungsten carbide. The super-hard table 402 may comprise any suitable super-hard material, such as silicon carbide, a diamond-silicon carbide composite, polycrystalline cubic boron nitride, polycrystalline cubic boron nitride and polycrystalline diamond, or any other suitable super-hard material or combination of super-hard materials.

As noted hereinabove, there may be fewer second bearing elements 224, 322 in the bearing assembly 204 and outer race 304 than there are first bearing elements 212, 312 in the first bearing assembly 202 and inner race 302. In some embodiments, a portion of or all of the second bearing elements 224, 322 may be thermally-stable PDCs, while the first bearing elements 212, 312 may be PDCs that are not as thermally stable (e.g., a PDC in which a polycrystalline diamond table thereof has not been leached of a metallic catalyst used to catalyze the formation of the polycrystalline diamond). Utilizing thermally-stable PDCs for the second bearing elements 224, 322 may compensate for their reduced load-bearing surface area due to their reduced number compared to the first bearing elements 212, 312.

A number of different types of thermally-stable PDCs may be used. In an embodiment, a thermally-stable PDC may include a cemented carbide substrate bonded to a polycrystalline diamond table. A portion of or substantially all of the metallic catalyst used to catalyze formation of the polycrystalline diamond table may be leached therefrom. Another suitable thermally-stable PDC includes an at least partially leached polycrystalline diamond table that is bonded to a cemented carbide substrate. Yet another suitable thermally-stable PDC includes a polycrystalline diamond table bonded to a cemented carbide substrate, with interstitial regions between bonded diamond grains of the polycrystalline diamond table having a nonmetallic catalyst disposed therein (e.g., one or more alkali metal carbonates, one or more alkaline metal carbonates, one or more alkaline earth metal hydroxides, or combinations thereof), silicon carbide, or combinations of the foregoing. As yet a further example, pre-sintered PCD tables may be bonded to a substrate (or employed separately) in various configurations, such as back-filled, leached, etc.

The thermal stability of a PDC may be evaluated by measuring the distance cut in a granite workpiece prior to failure without using coolant in a vertical turret lathe ("VTL") test. The distance cut is considered representative of the thermal stability of the PDC. In some embodiments, the second bearing elements 224, 322 may have a VTL-test distance to failure, that is at least three times and, more particularly, about five times greater than that of the first bearing elements 212, 312.

Figure 5:
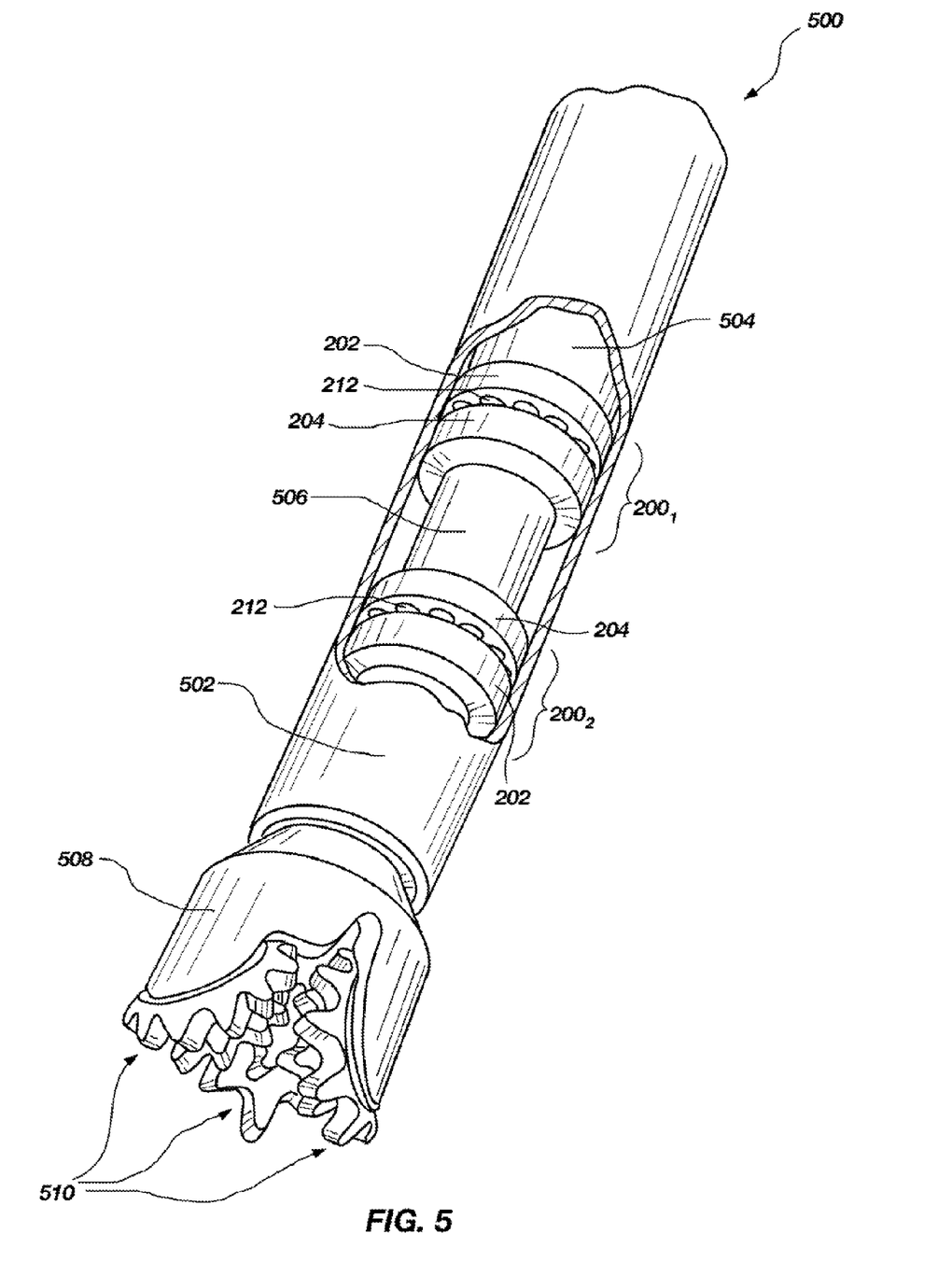
FIG. 5 is a schematic isometric cutaway view of an embodiment of a subterranean drilling system that includes at least one of the thrust-bearing apparatuses shown in FIG. 2A.

FIG. 5 is a schematic isometric cutaway view of a subterranean drilling system 500 that includes at least one of the thrust-bearing apparatuses 200 shown in FIG. 2A according to another embodiment. The subterranean drilling system 500 includes a housing 502 enclosing a downhole drilling motor 504 (i.e., a motor, turbine, or any other device capable of rotating an output shaft) that is operably connected to an output shaft 506. A first thrust-bearing apparatus $200_1$ (FIG. 2A) is operably coupled to the downhole drilling motor 504 to form a motor assembly. A second thrust-bearing apparatus $200_2$ (FIG. 2A) is operably coupled to the output shaft 506. A rotary drill bit 508 configured to engage a subterranean formation and drill a borehole is connected to the output shaft 506. The rotary drill bit 508 is shown as a roller-cone bit including a plurality of roller cones 510. However, other embodiments may utilize different types of rotary drill bits, such as a fixed-cutter drill bit. As the borehole is drilled, pipe sections may be connected to the subterranean drilling system 500 to form a drill string capable of progressively drilling the borehole to a greater depth within the earth.

The first thrust-bearing apparatus $200_1$ includes a first bearing assembly 202 configured as a stator that does not rotate and a second bearing assembly 204 configured as a rotor that is attached to the output shaft 506 and rotates with the output shaft 506. The on-bottom thrust generated when the drill bit 508 engages the bottom of the borehole may be carried, at least in part, by the first thrust-bearing apparatus $200_1$. The second thrust-bearing apparatus $200_2$ includes a first bearing assembly 202 configured as a stator that does not rotate and a second bearing assembly 204 configured as a rotor that is attached to the output shaft 506 and rotates with the output shaft 506. Fluid flow through the power section of the downhole drilling motor 504 may cause what is commonly referred to as "off-bottom thrust," which may be carried, at least in part, by the second thrust-bearing apparatus $200_2$.

During use, drilling fluid may be circulated through the downhole drilling motor 504 to generate torque and effect rotation of the output shaft 506, and the second bearing assemblies 204 (i.e., the rotors) and the rotary drill bit 508 attached thereto so that a borehole may be drilled. A portion of the drilling fluid may also be used to lubricate opposing bearing surfaces of the bearing elements of the thrust-bearing apparatuses $200_1$ and $200_2$ of which only bearing elements 212 are illustrated in FIG. 5.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A method of operating a thrust-bearing apparatus, comprising:
   providing the thrust-bearing apparatus, wherein the thrust-bearing apparatus includes:
      a first bearing assembly including a plurality of circumferentially-spaced first bearing elements each of which includes a first bearing surface including polycrystalline diamond, each of the plurality of circumferentially-spaced first bearing elements circumferentially spaced from a circumferentially nearest one of the plurality of circumferentially-spaced first bearing elements by a respective first lateral spacing less than a respective first lateral dimension of the circumferentially nearest one of the plurality of circumferentially-spaced first bearing elements; and
      a second bearing assembly including a plurality of circumferentially-spaced second bearing elements each of which includes a second bearing surface oriented to engage the first bearing surfaces of the first bearing assembly during operation, each of the plurality of circumferentially-spaced second bearing elements circumferentially spaced from a circumferentially nearest one of the plurality of circumferentially-spaced second bearing elements by a respective second lateral spacing greater than a respective second lateral dimension of the circumferentially nearest one of the plurality of circumferentially-spaced second bearing elements, wherein the respective second lateral spacing is greater than the respective first lateral spacing, and wherein the respective second lateral dimension is equal to or greater than the respective first lateral spacing; and
   rotating one of the first bearing assembly or the second bearing assembly.

2. The method of claim 1 wherein the number of the second bearing elements is less than the number of the first bearing elements, and wherein at least some of the plurality of circumferentially-spaced second bearing elements are more thermally stable than the plurality of circumferentially-spaced first bearing elements.

3. The method of claim 1 wherein the respective second lateral spacing is at least about two times greater than an average of the second lateral dimensions of the plurality of circumferentially-spaced second bearing elements.

4. The method of claim 1 wherein the plurality of circumferentially-spaced second bearing elements are substantially equally circumferentially spaced from each other.

5. The method of claim 1 wherein the respective first lateral spacing is less than an average of the first lateral dimensions exhibited by the plurality of circumferentially-spaced first bearing elements.

6. The method of claim 1 wherein the second bearing assembly includes a bearing support including the plurality of circumferentially-spaced second bearing elements mounted thereto, the bearing support including at least one flow obstruction element positioned and configured to provide a selected fluid flow over the second bearing surfaces of the plurality of circumferentially-spaced second bearing elements.

7. The method of claim 1 wherein each of the plurality of circumferentially-spaced first bearing elements includes a substrate having a polycrystalline diamond table defining the first bearing surface comprising the polycrystalline diamond.

8. The method of claim 1 wherein each of the plurality of circumferentially-spaced second bearing elements includes a substrate having a polycrystalline diamond table defining the second bearing surface.

9. The method of claim 1 wherein one of the first or second thrust-bearing assemblies is a stator and the other one of the first or second thrust-bearing assemblies is a rotor.

10. A method of operating a thrust-bearing apparatus, comprising:
    providing the thrust-bearing apparatus, wherein the thrust-bearing apparatus includes:
       a first bearing assembly including a plurality of circumferentially-spaced first bearing elements each of which includes a first polycrystalline diamond body defining a first bearing surface, each of the plurality of circumferentially-spaced first bearing elements circumferentially spaced from a circumferentially nearest one of the plurality of circumferentially-spaced first bearing elements by a respective first lateral spacing less than a respective first lateral dimension of the circumferentially nearest one of the plurality of circumferentially-spaced first bearing elements; and
       a second bearing assembly including a plurality of circumferentially-spaced second bearing elements each of which includes a second polycrystalline diamond body defining a second bearing surface oriented to engage the first bearing surfaces of the first bearing assembly during operation, each of the plurality of circumferentially-spaced second bearing elements circumferentially spaced from a circumferentially nearest one of the plurality of circumferentially-spaced second bearing elements by a respective second lateral spacing greater than a respective second lateral dimension of the circumferentially nearest one of the plurality of circumferentially-spaced second bearing elements, wherein the respective second lateral spacing is greater than the respective first lateral spacing, and wherein the respective second lateral dimension is equal to or greater than the respective first lateral spacing; and
    rotating one of the first bearing assembly or the second bearing assembly.

11. The method of claim 10 wherein the number of the second bearing elements is less than the number of the first bearing elements, and wherein at least some of the plurality of circumferentially-spaced second bearing elements are more thermally stable than the plurality of circumferentially-spaced first bearing elements.

12. The method of claim 10 wherein the respective second lateral spacing is at least about two times greater than an average of the second lateral dimensions of the plurality of circumferentially-spaced second bearing elements.

13. The method of claim 10 wherein the plurality of circumferentially-spaced second bearing elements are substantially equally circumferentially spaced from each other.

14. The method of claim 10 wherein the respective first lateral spacing is less than an average of the first lateral dimensions exhibited by the plurality of circumferentially-spaced first bearing elements.

15. The bearing apparatus of claim 10 wherein the second bearing assembly includes a bearing support including the plurality of circumferentially-spaced second bearing elements mounted thereto, the bearing support including at least one flow obstruction element positioned and configured to provide a selected fluid flow over the second bearing surfaces of the plurality of circumferentially-spaced second bearing elements.

16. The method of claim 10 wherein each of the plurality of circumferentially-spaced first bearing elements includes a substrate having a polycrystalline diamond table comprising the first polycrystalline diamond body.

17. The method of claim 10 wherein each of the plurality of circumferentially-spaced second bearing elements includes a substrate having a polycrystalline diamond table comprising the second polycrystalline diamond body.

18. The method of claim 11 wherein one of the first or second thrust-bearing assemblies is a stator and the other one of the first or second thrust-bearing assemblies is a rotor.

19. A method of operating a thrust-bearing apparatus, comprising:
   providing the thrust-bearing apparatus, wherein the thrust-bearing apparatus includes:
      a stator including a plurality of circumferentially-spaced first bearing elements each of which includes a first polycrystalline diamond body defining a first bearing surface, each of the plurality of circumferentially-spaced first bearing elements circumferentially spaced from a circumferentially nearest one of the plurality of circumferentially-spaced first bearing elements by a respective first lateral spacing less than a respective first lateral dimension of the circumferentially nearest one of the plurality of circumferentially-spaced first bearing elements; and
      a rotor including a plurality of circumferentially-spaced second bearing elements each of which includes a second polycrystalline diamond body defining a second bearing surface oriented to engage the first bearing surfaces of the first bearing assembly during operation, each of the plurality of circumferentially-spaced second bearing elements circumferentially spaced from a circumferentially nearest one of the plurality of circumferentially-spaced second bearing elements by a respective second lateral spacing greater than a respective second lateral dimension of the circumferentially nearest one of the plurality of circumferentially-spaced second bearing elements, wherein the respective second lateral spacing is greater than the respective first lateral spacing, and wherein the respective second lateral dimension is equal to or greater than the respective first lateral spacing;
      wherein the number of the second bearing elements is less than the number of the first bearing elements, and wherein at least some of the plurality of circumferentially-spaced second bearing elements are more thermally stable than the plurality of circumferentially-spaced first bearing elements; and
   rotating the rotor relative to the stator.

* * * * *